Nov. 20, 1945.  T. J. GAGNON ET AL  2,389,496
APPARATUS FOR CONVEYING AND ARRANGING BOTTLES, JARS, CANS, OR THE LIKE
Filed Feb. 8, 1945     5 Sheets-Sheet 1

Inventors:
Thomas J. Gagnon
and Arnold S. Alcorn
by Lloyd G. Bates
Attorney.

Witness:
A. A. Horn

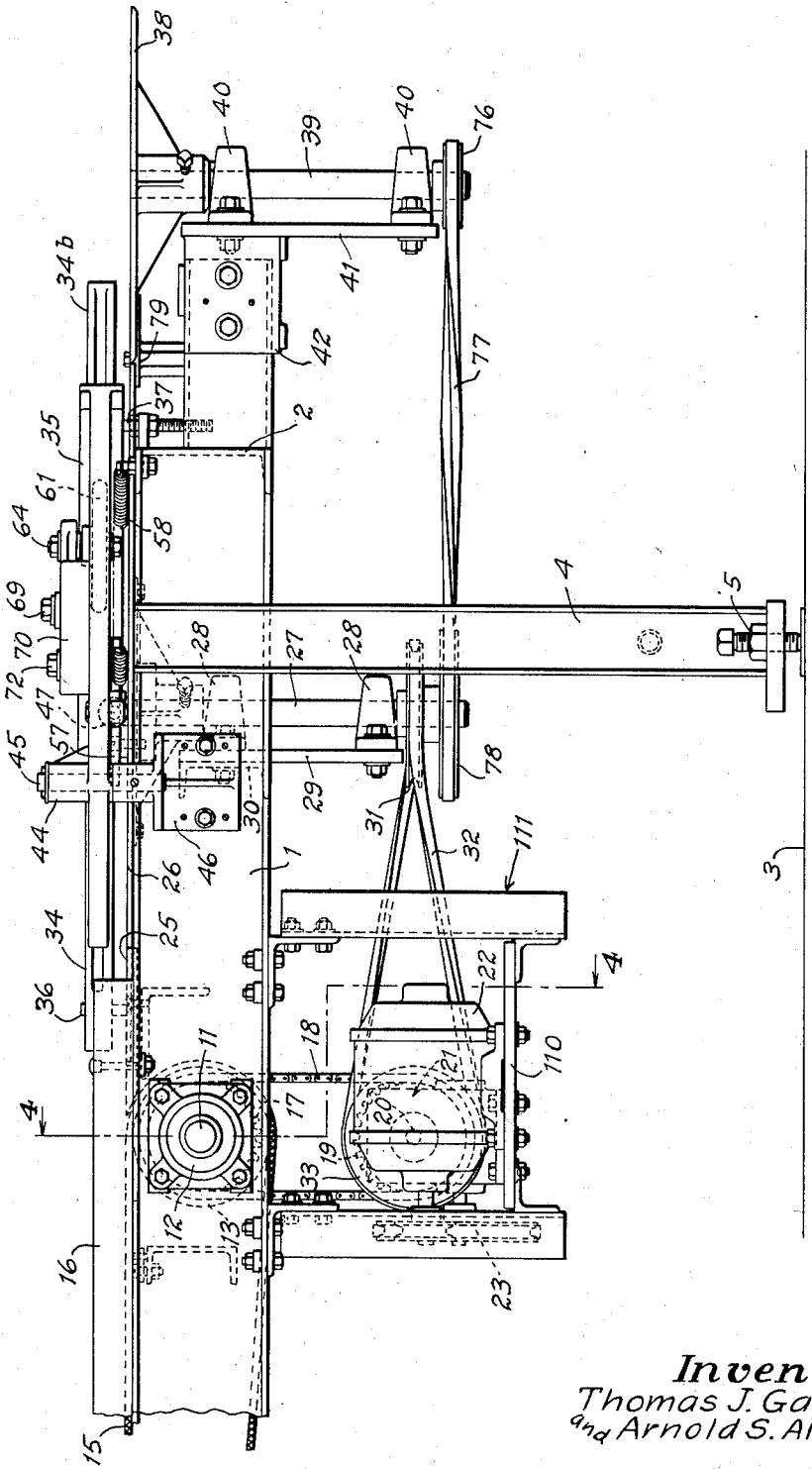

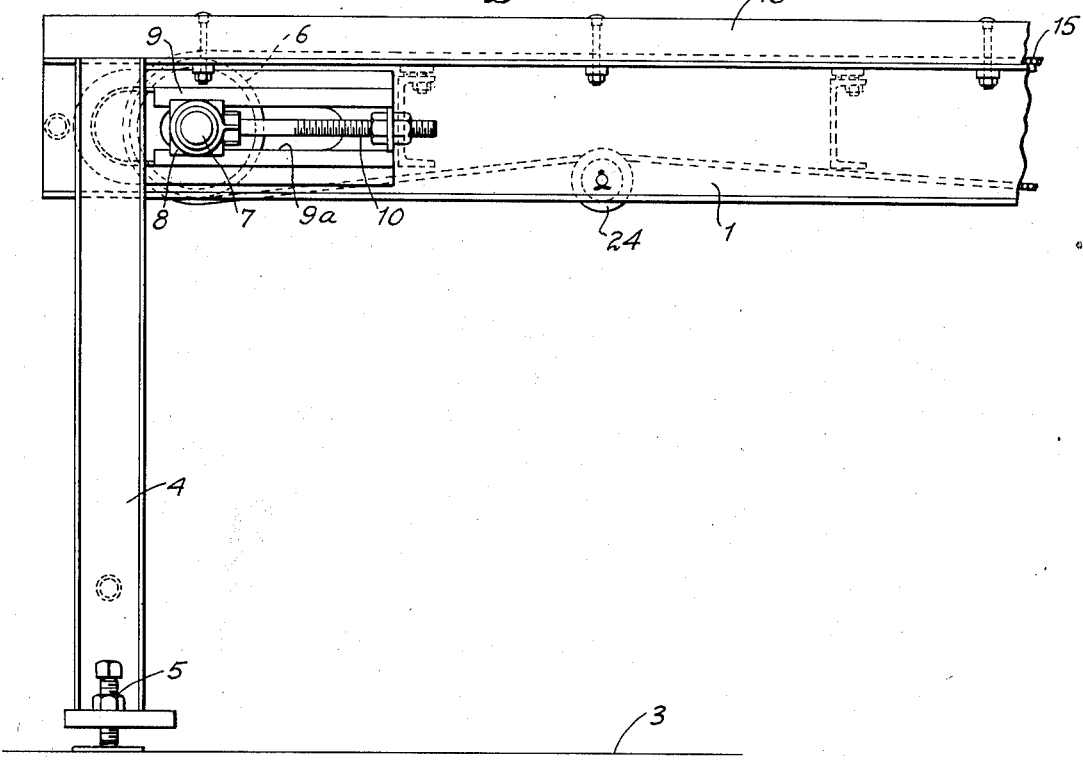
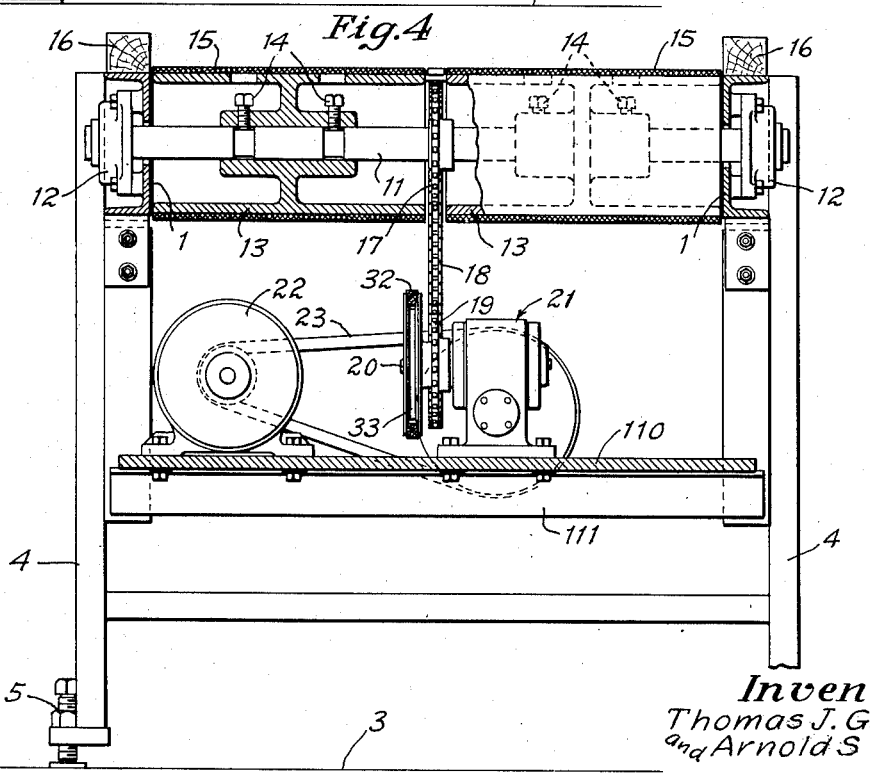

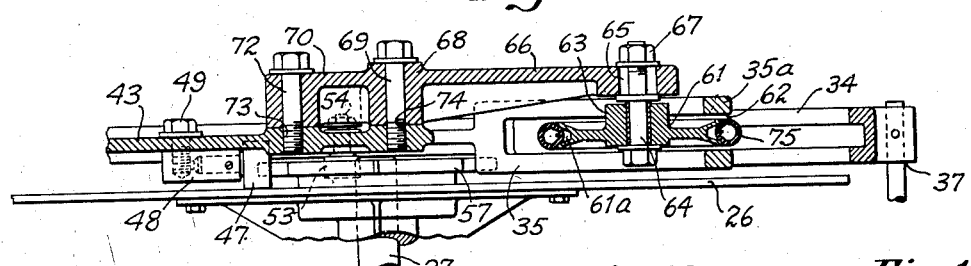
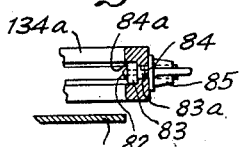
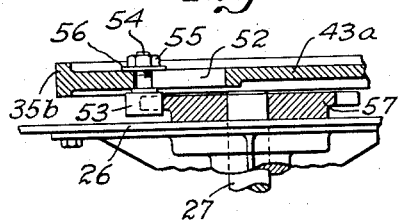
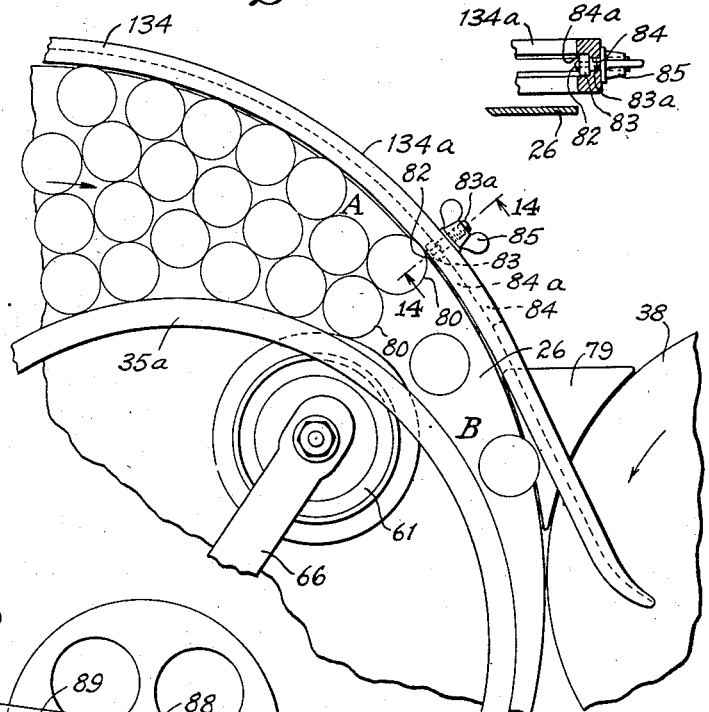
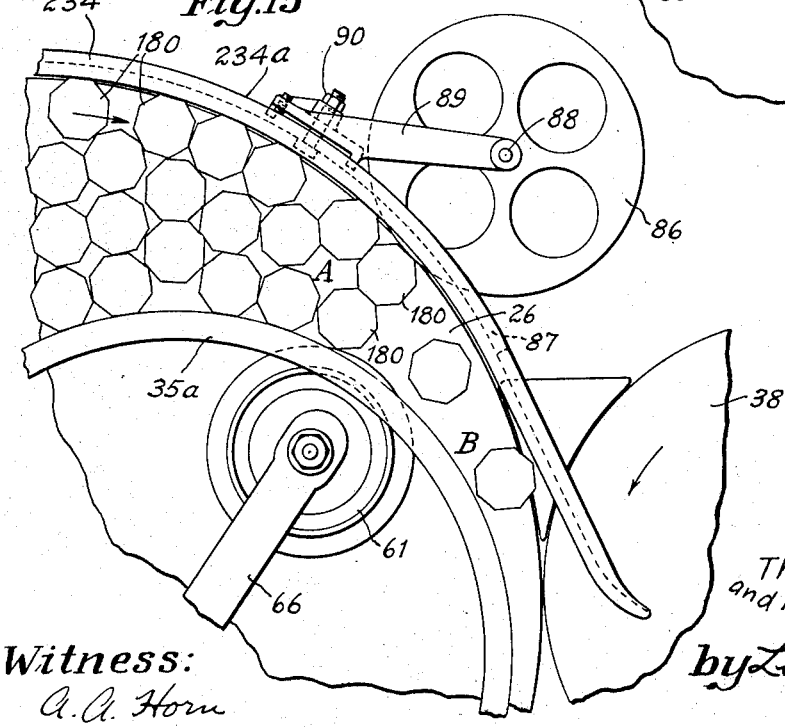

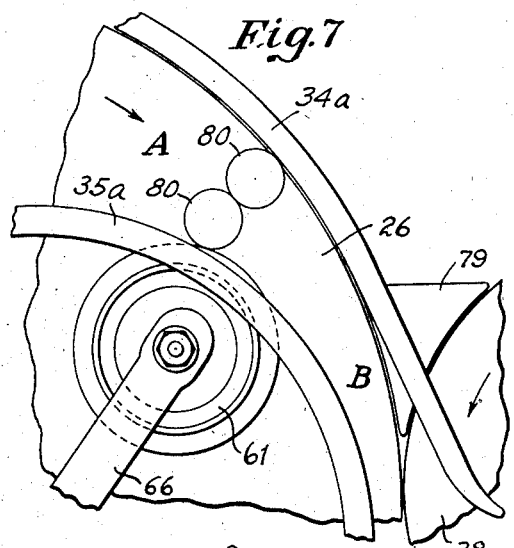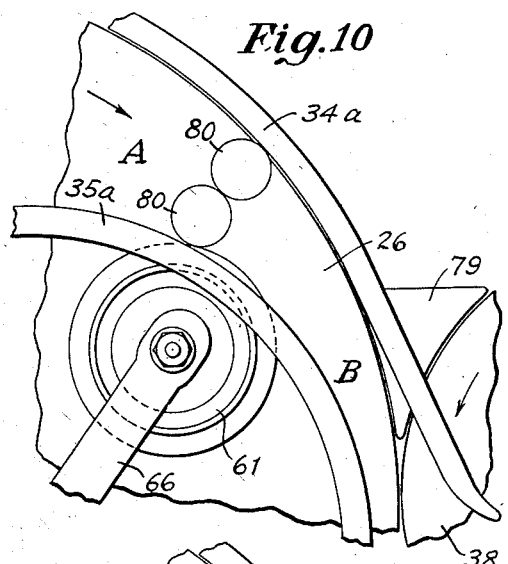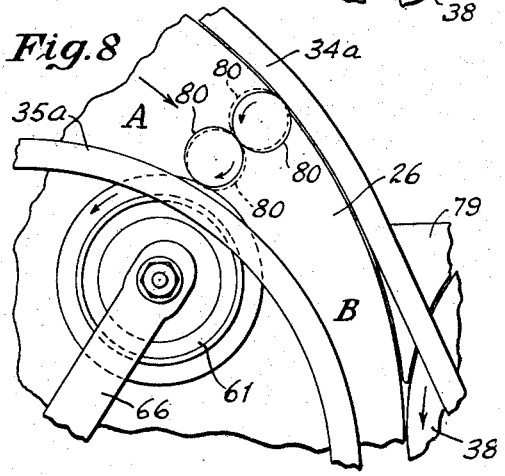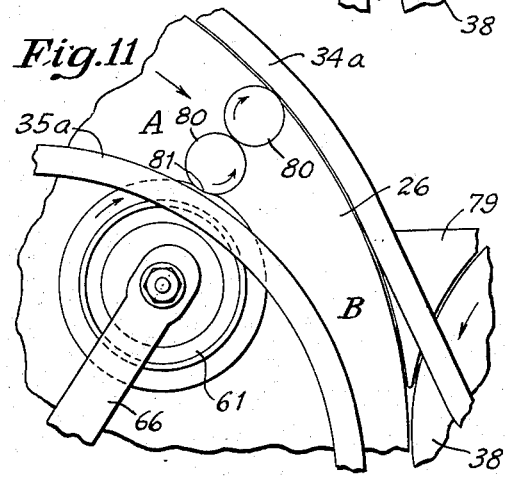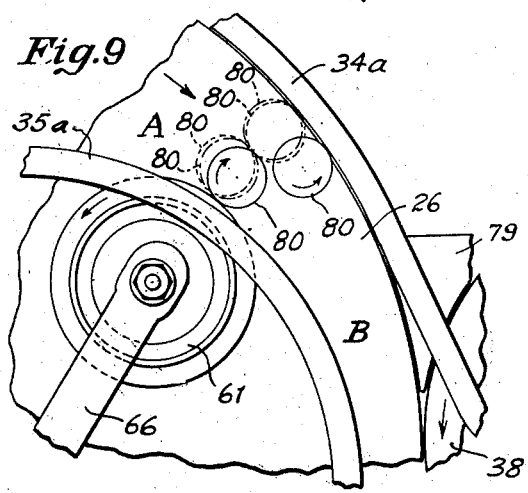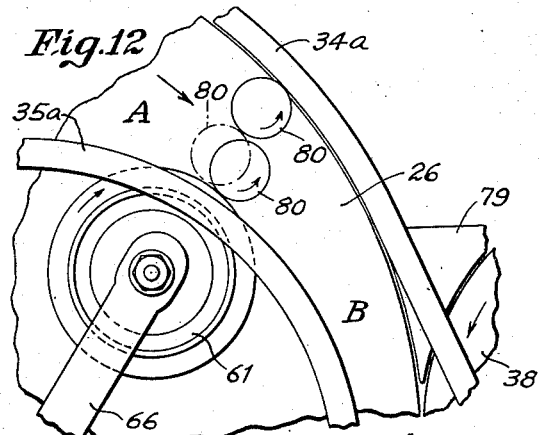

Patented Nov. 20, 1945

2,389,496

UNITED STATES PATENT OFFICE 2,389,496

APPARATUS FOR CONVEYING AND ARRANGING BOTTLES, JARS, CANS, OR THE LIKE

Thomas J. Gagnon, East Hartford, and Arnold S. Alcorn, Granby, Conn., assignors to Hartford-Empire Company, Hartford, Conn., a corporation of Delaware Application February 8, 1945, Serial No. 576,766

18 Claims. (Cl. 198—32)

This invention relates to improvements in apparatus for receiving bottles, jars or other containers in large numbers, as in lots or groups from cartons or boxes, or otherwise, and for arranging said articles in a single file procession, ready to be fed to a filler or some other associate machine.

A field of utility of apparatus of the character described is in glass container packing plants and bottling works. In this field, such apparatuses are customarily called "unscramblers." Since an apparatus embodying the present invention is designed and is particularly well adapted for use in this field, although the invention is not restricted thereto, the term "unscrambler" will sometimes be used herein as a convenient term to designate our novel apparatus.

All prior unscramblers known to us have the fault or shortcoming that frequent jamming or clogging thereof is likely to occur, and actually is inherent in the operation of such prior devices unless forestalled by quick and effective manual action. In general, such prior unscramblers operate by moving or conducting the articles being handled in a more or less crowded or congested condition from a relatively wide space to and through a narrowing passage or entrance to a channel or runway which is but slightly wider than each of the articles being conveyed by the device. Some of these prior devices have oscillating or movable article guides or deflectors in their means for directing articles from wider spaces into their narrow channels or runways. However, in all such prior devices of which we are aware, crowding of the articles being transported into a narrowing passage or entrance to a narrow runway is under conditions such that jamming or clogging of the passage or entrance to the runway may occur, as when two of the articles are wedged therein in positions approximately abreast of each other, and such jamming or clogging will not be relieved by the apparatus itself but requires manual action. In other words, it is necessary, in the operation of each of the prior devices known to us, that an operator or attendant be ready at all times to act quickly and effectively to break up each jam or clogging of the passage of the device. Of course, jamming or clogging of such a device will interrupt continuity of delivery of a line of articles to the associate filler or other machine and may cause breakage of the articles or impairment of the apparatus employed.

An object of the present invention is to provide an efficient and dependable unscrambler which will be free from the hereinbefore mentioned fault or shortcoming of the prior unscramblers.

A further object of the invention is to provide an unscrambler which is adapted to operate satisfactorily for the purpose intended without requiring manual action by an operator or attendant to prevent jamming or clogging of the device.

A further object of the invention is to provide an unscrambler which has automatic means for acting on the articles being moved thereby so as to prevent two of such articles from remaining in a jam-causing relationship in the entrance to the narrow runway or single file passage of the device, whereby jamming or clogging of our unscrambler is effectually precluded.

A further object of our invention is to provide an unscrambler which is adapted satisfactorily to move and arrange in single file bottles, jars or like articles which are non-circular or polygonal in cross-section.

In carrying out our invention to attain the foregoing and other objects thereof, we may provide two suitably formed guide rails and suitably support them so that they define between them a passage which narrows from a portion of much greater width to a narrow runway having a width but slightly greater than that of each of the articles which are to be arranged in a single file order. A suitable conveyor may be provided according to our invention for supporting the articles in an upright position and for moving them along this passage from the wide portion into and through the narrow runway. Our invention further provides means to oscillate one of these rails relative to the other so as to keep the articles moving toward the narrow runway continuously in further motion, each in relation to others, thus tending to cause these articles to be arranged from a crowded or congested condition into a single file procession at the entrance to the narrow runway. An important feature of our invention is the provision of novel means at the entrance to the narrow runway to prevent two of the articles becoming stabilized in positions approximately abreast of each other at the entrance to the narrow runway. To this end, our invention preferably provides an article contacting surface, preferably of a yieldable, elastic or resilient character, projecting into the passage at the entrance to the narrow runway and adapted to move about a pivotal axis either in a direction having a component toward the narrow runway or in the opposite direction, whereby the articles bridging the space between this movable contact surface and the opposite wall of the entrance to the runway may move relatively to each other as the movable guide rail of the device is oscillated. As a consequence, one or the other of such two articles will move ahead of the other into the narrow runway, thereby automatically dissipating a condition which, had it been permitted to persist, would have caused a jam at the entrance to the runway.

Other objects of the present invention and advantages thereof will hereinafter be pointed out or will become apparent from the following description of illustrative practical embodiments of the invention, as shown in the accompanying drawings, in which:

Fig. 2 is a side elevation of the portion of the device shown in Fig. 1;

Fig. 3 is a side elevation of the aforesaid article receiving or loading end portion of the device;

Fig. 4 is a cross section substantially along the line 4—4 of Fig. 2;

Fig. 5 is a relatively enlarged fragmentary sectional view substantially along the line 5—5 of Fig. 1, showing details of the cooperative article guiding and jam-preventing elements of our device;

Fig. 6 is a fragmentary sectional detail view, showing part of the mechanism for oscillating the oscillatory guide rail of our device;

Fig. 7 is a fragmentary diagrammatic plan view of the portion of our novel unscrambler which is involved in the breaking up of an incipient jam of two of the articles at the entrance to the narrow runway portion of the device, the view showing two of such articles in positions which, if they became stabilized, would cause a jam;

Fig. 8 is a view similar to Fig. 7, but showing how the cooperative jam-preventing elements of our unscrambler cause relative rolling of the two articles in contact with each other so as to initiate breaking up of the incipient jam;

Fig. 9 is a view similar to Figs. 7 and 8, but showing in full lines the relative positions of the two articles after the incipient jam has been broken up, the dotted and the dot-and-dash lines showing prior relative positions of the two articles at different stages in the operation of breaking up of the incipient jam;

Fig. 10 is a view similar to Fig. 7 but showing two articles approaching the entrance to the narrow runway portion of the device in slightly different relative positions than those shown in Fig. 7;

Fig. 11 is a view generally similar to Fig. 8, but showing the relative rotary movements of the two articles involved as the cooperative elements of the device act to break up the incipient jam;

Fig. 12 is a view generally like Fig. 9 but showing in full lines the relative positions of the two articles after the incipient jam has been broken up, the dot-and-dash lines indicating the Fig. 10 position of the inner of these two articles;

Fig. 13 is a fragmentary plan view of a slightly modified form of our unscrambler, showing a fixed article stop or abutment on the outer guide rail;

Figure 1:
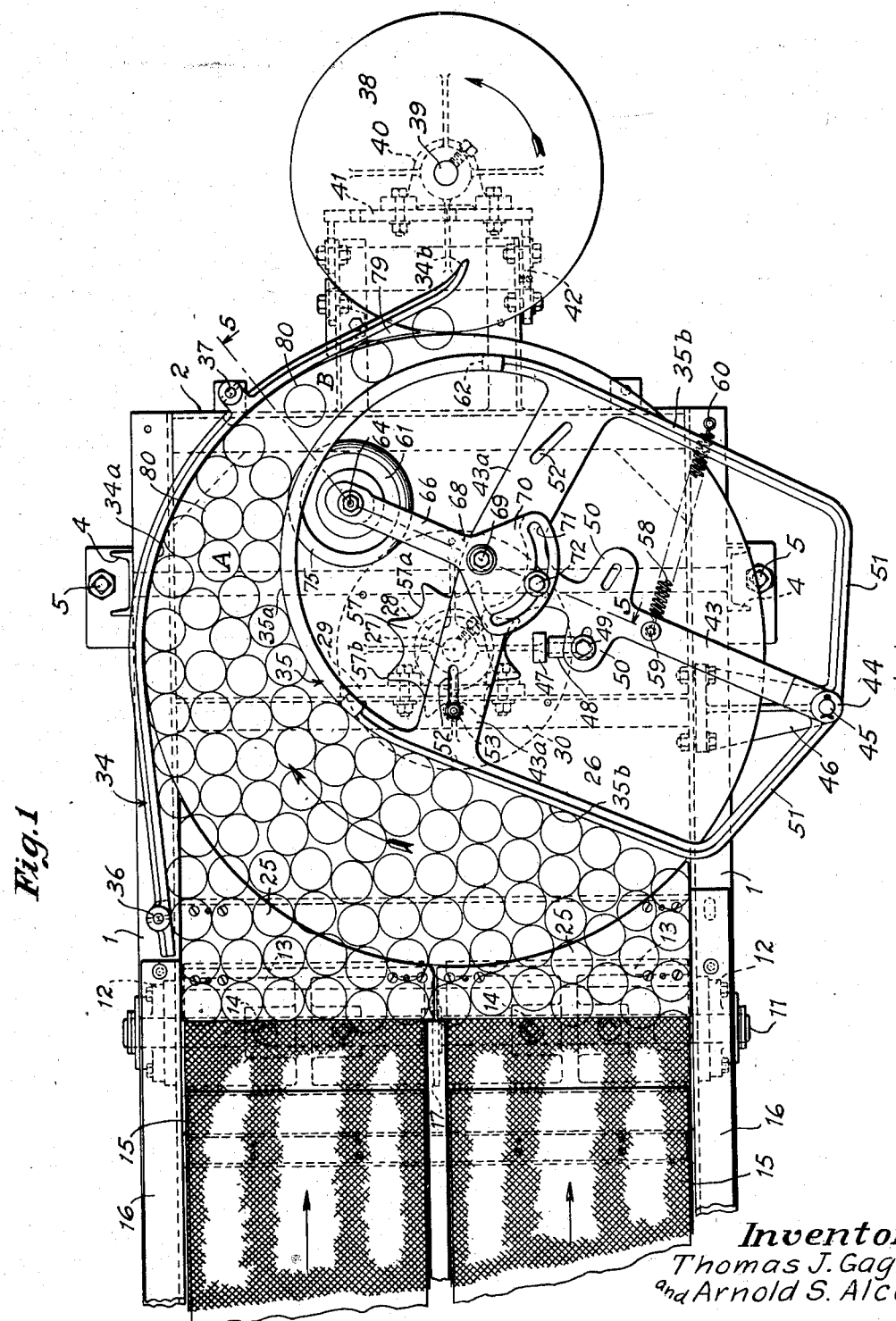
Figure 1 is a plan view of the major portion of our improved device, the article receiving or loading end portion thereof having been broken away and omitted.

Fig. 14 is a fragmentary sectional view substantially along the line 14—14 of Fig. 13, showing details of the fixed stop or abutment on the outer guide rail of the device; and Fig. 15 is a fragmentary plan view of a further modification in which a pivoted abutment wheel is provided on the outer guide rail in position to protrude slightly into the article passage at the entrance to the narrow runway and opposite the inner pivoted wheel.

The main supporting structure of our novel device may comprise a substantially rectangular top frame comprising a pair of longitudinal side members 1, Figs. 1 to 4, inclusive, connected at their ends by end frame members such as that indicated at 2 in Fig. 1. This top frame may be supported at the desired height above a supporting floor 3 by uprights or legs 4 which may be connected at their upper ends to the top frame, as to the longitudinal side members 1 of the latter, and which may have adjusting devices, such as the jack screws 5 at their lower ends, for adjusting the level of the top frame.

The component members of the framework structure may be suitably stayed or braced or tied together in any suitable way or by any suitable known means, if required to make such structure suitably strong and rigid. These details of the supporting structure do not form part of the present invention.

The rectangular top frame of the supporting structure provides a support or bed for the article conveying and arranging mechanism. As shown, a conveyor roller 6, Fig. 3, is carried by a shaft 7 having its ends mounted in bearing boxes or journals, such as that indicated at 8. These bearing boxes or journals are mounted in slideways on the longitudinal side members 1 of the top frame structure adjacent to the receiving end of the device, one such slideway being indicated at 9 in Fig. 3. The roller 6 may be shifted for a short distance longitudinally of the top frame, as by the adjusting screw indicated at 10 in Fig. 3, the supporting structure being suitably slotted, as at 9a, Fig. 3, to permit such shifting of the shaft.

A second transverse shaft, 11, is supported at its ends in bearing boxes or journals 12 carried by the longitudinal side frame members 1 at an intermediate portion of the device, as best seen in Figs. 1 and 4, one of such bearing boxes or journals also being shown in Fig. 2. A driven roller for cooperating with the roller 6 comprises a pair of aligned and slightly spaced apart sections 13 which are secured to the shaft 11, as by the set screws 14, Fig. 4. The roller 13—13 cooperates with the adjustable roller 6, which likewise may comprise two aligned sections like the sections of the driven roller, to support and drive an endless conveyor which may comprise the two side-by-side endless sections 15, Figs. 1 and 4. These sections of the conveyor may be finely woven wire mesh belts and the stretches thereof may be kept desirably taut by adjustment of the position of the conveyor supporting roller 6 relative to the driven roller 13—13. The upper stretch of this conveyor is supported in the top frame structure of the device between parallel longitudinal retaining rails 16, Figs. 1 to 4, inclusive, on the longitudinal side members 1 of the top frame structure. Driving of the conveyor 15—15 may be effected by providing a sprocket 17, Figs. 1 and 4, on the shaft 11 between the sections 13—13 of the driven roller and connecting such sprocket by a chain 18, Figs. 2 and 4, with a sprocket 19 on the driven shaft 20 of a speed reduction unit 21. The latter is driven from a motor 22 with which it has a suitable driven connection, indicated at 23, Figs. 2 and 4. The lower stretch of the conveyor 15—15 may pass over an idler roll 24 which extends between and is supported by the longitudinal side members of the top frame, substantially as shown in Fig. 3. The motor 22 and speed reduction unit 21 may be supported upon a plate 110 which may be carried by a suitable suspension framework 111, depending from the top frame structure, Figs. 2 and 4.

The conveyor 15—15 may be termed the carrying in or supply conveyor of the device. It is intended to receive on its top surface large numbers of the articles to be conveyed and arranged. Thus, cartons (not shown) containing lots of 12 bottles or jars, for example, may be dumped upon the conveyor 15—15 at or near the receiving end of the device. These will be moved forwardly by the upper stretch of the conveyor, the direction of movement of which may be as indicated by the arrows thereon in Fig. 1.

The conveyor 15—15 will discharge the articles carried thereby onto dead plates 25, Fig. 1, and the pressure of the oncoming articles will move the articles on the dead plate across the latter onto a second conveyor which may be a rotating, horizontal disk or plate 26. The plate 26 is the conveyor of the unscrambler or article arranging mechanism proper of the device. It is mounted upon the upper end of a vertical shaft 27 which may be rotatably supported in bearings 28 on a hanger 29 carried by a bracket structure 30 depending from the supporting top frame structure, Fig. 2. The shaft 27 may be rotated to rotate the conveyor plate 26 in the direction indicated by the arrow thereon in Fig. 1, as by connecting a pulley 31 on the shaft 27 by a quarter-turn belt 32 with a pulley 33 on the driven shaft 20 of the aforesaid speed reduction unit 21. See Fig. 2.

The rotary plate conveyor 26 will move the articles thereon between an outer guide rail 34 and a cooperative U-shaped inner guide rail 35, Fig. 1. The outer guide rail 34 may be secured in a fixed position on the top frame structure, as at 36 and 37, Fig. 1, so that a suitably curved portion thereof, indicated at 34a, extends above the peripheral edge portion of the rotary conveyor plate 26 opposite to an arcuately curved portion 35a of the inner guide rail 35. The portion 34a of the outer guide rail may be curved arcuately to correspond to the curvature of the periphery of the rotary disk conveyor 26. The end portions of the outer guide rail may be suitably formed so that the end portion thereof nearest to the conveyor 15—15 extends on top of one of the longitudinal side frame members 1 to the adjacent end of one of the retaining rails 16 while the opposite or outer end portion of such guide rail diverges from the periphery of the rotary disk beyond the end frame member 2 so as to partially overlie a rotary delivery disk conveyor 38. The latter is rotatably supported in cooperative relation with the rotary disk 26 in the same plane as the latter and in position to receive articles therefrom, as hereinafter will be explained. The extreme outer end of the outer guide rail may be slightly curved at 34b in a reverse direction to 34a. The rotary disk 38 may be carried by a vertical shaft 39, Figs. 1 and 2, which is rotatably supported in vertically spaced bearings 40, Fig. 2, on a hanger 41 which is carried by a bracket structure 42 on the end of the top frame of the main supporting structure.

The arcuately curved portion 35a or bight of the inner guide rail conforms to the curvature of a portion of a circle of substantially less radius than that of the rotary disk 26 or of the circle to which the curved portion 34a of the outer guide rail 34 conforms. The ends of the arcuately curved portion 35a of the inner guide rail may be prolonged to provide a pair of substantially straight and parallel side portions 35b of sufficient length to extend beyond the edge of the disk 26 at the side of the structure opposite to the guide rail 34 when the inner guide rail is oscillatorily supported above the rotating disk 26 in the position shown in Fig. 1. In this position, the inner guide rail cooperates with the outer guide rail to define between them a guide passage for arranging the articles carried by the disk 26 in a single file procession. As shown, the inner guide rail is mainly supported and is oscillated by a lever 43 having a hub portion 44 loosely mounted on a short vertical shaft or stud 45 carried by a lateral bracket 46 on the forward end portion of one of the longitudinal side members 1 of the top frame of the main supporting structure. The lever 43 has a T-shaped outer end portion, the lateral branches 43a of which are united at their outer ends, integrally in the present example, with the side portions 35b of the inner guide rail. A caster wheel or roller 47, Figs. 1 and 5, on a supporting arm 48, which is adjustably fastened at 49, Fig. 1, to one of a pair of laterally extending wings 50 on the lever 43, rests upon the rotary disk 26 and aids in supporting the lever-and-inner-guide-rail-unit above the disk 26 for horizontal oscillation relative to the latter without undue stress on the pivotal connection of such unit with the vertical shaft or stud 45. For the sake of rigidity and strength, the side arm portions 35b of the inner guide rail may be joined integrally with the hub 44 of the lever 43 by a pair of struts or connecting arms 51.

The laterally extending branches 43a of the T-shaped head of the lever 43 are provided with obliquely extending slots 52. As best seen in Fig. 6, a cam roller 53 is mounted on a stud or short shaft 54 which extends through one of these slots 52 and is fastened to the arm 43a in adjusted position along such slot 52, as by the nut 55 and the washer 56. The cam roller 53 follows the contour of a cam 57 which, in the example shown, has the shape of a star wheel and is mounted to rotate with the disk 26 about the axis of the shaft 27. A coil spring 58 is fastened at one end, as at 59, Fig. 1, to the lever 43 and at its opposite end, as at 60, to the forward end of the top frame of the main supporting structure and maintains the roller 53 constantly against the periphery of the star wheel cam 57. In consequence of this arrangement, the inner guide rail is oscillated about the axis of the shaft or stud 45 above the rotating disk 26 and relative to the outer guide rail 34. The extent of the oscillatory strokes of the arcuately curved portion 35a of the inner guide rail is determined by the contour of the cam 57, the periphery of which comprises a series of similar indentations or low places 57a and high places 57b so that each complete rotation of the star wheel will cause a plurality of oscillations of the inner guide rail. The position of the path of each oscillation of the inner guide rail in relation to the underlying rotating disk 26 and to the outer guide rail 34 may be varied within limits by varying the position of attachment of the shank of the cam roller carrying element 54 along the slot 52 in a lateral branch of the T-shaped head portion of the rail-oscillating lever. By moving the outer guide rail 34 and the lever supporting bracket 46, each to the opposite side of the top frame from the position shown in Fig. 1, attaching the cam roller to the other lateral branch of the lever head portion, moving the caster 47 to the other side of the lever, and reversing the directions of rotations of the rotary conveyors 26 and 38, the location of the path of the single file procession of articles may be shifted across the rotating disk conveyor 26 and the direction of rotary movement of the articles by the rotating delivery disk conveyor 38 thus reversed. This permits feeding to either a right-or-left-hand-feed filler or other associate machine.

The shapes of the cooperative guide rail members, their positions, and the adjustments of the adjusting devices for the oscillating inner guide rail are predetermined so that articles supplied in a crowded condition from the conveyor 15—15 onto the rotating disk 26 will be rapidly guided from a space extending substantially the full width of the top frame structure through a narrowing space between the arcuately curved portions of the two guide rails, indicated at A in Fig. 1, and thence into and along a still narrower runway, indicated at B. The width of the latter may be only sufficiently greater than the width of each of the articles to be arranged in a single file procession to permit each article of that procession to be moved readily through the runway. This width is of course less than twice the width of each article.

The transporting movement given to all the articles will be attended by constant agitation of such of the articles as contact with the oscillating inner guide rail or with other articles which have been moved or guided by such rail.

It will be noted that the curvatures of the cooperative outer and inner guide rails and their relative positions are such that the passage between them curves arcuately where such passage narrows from a much greater width to the width of its narrow runway portion. The oscillations of the inner guide rail move the arcuately curved portion of such rail in an arc located between the outer guide rail and the axis of rotation of the disk conveyor 26 somewhat in advance of the axis of rotation of such conveyor. In the example shown, the radius of this arc is greater than that of the disk conveyor 26 and the oscillations are about an axis located laterally of the edge of the disk conveyor 26 at the opposite side of the structure from the outer guide rail and at a point located slightly rearwardly of the axis of rotation of such disk conveyor. Oscillatory movement of the curved portion of the inner guide rail in one direction thus will slightly narrow and slightly widen the narrow runway and wider portions, respectively, of the curved passage between the two rails. The return oscillatory movement of the inner guide rail will have an opposite effect.

The structural arrangement and operation just described are well adapted to arrange the articles on the rotating disk 26 in a single file order as such articles are moved from a crowded condition or congestion through the curved narrowing passage into the narrow runway space between the guide rails. The invention, however, provides a further safeguard against jamming of articles in the narrowing passage or entrance A to the narrow runway B. The structure which affords this additional safeguard constitutes an important feature of the present invention. It comprises a rotary wheel 61, Figs. 1 and 5, having its peripheral portion arranged to project through a longitudinally extending horizontal slot 62 in the arcuately curved outer end portion 35a of the inner guide rail so as to constitute a movable abutment in the passage between the guide rails at approximately the place at which two of the articles, if abreast of each other, might become wedged between the two guide rails. The wheel 61 is shown, Fig. 5, as having a hub 63 loosely mounted on a vertical stud or short shaft 64 which extends through a slot 65 in the outer end portion of a supporting arm 66, the stud 64 being fastened to the supporting arm in adjusted position along the slot 65, as by means of a nut 67. The arm 66 is an arm of a lever 68 which is mounted on the shank of a cap bolt 69 carried by the T-shaped head portion of the lever 43 at a point midway between the side members 35b of the inner guide rail-and-lever unit. The lever 68 includes an adjusting arm or tail piece 70 which, as best seen in Fig. 1, is of quadrant shape and is provided with an arcuate slot 71 concentric with the hub of the lever 68. A fastening device therefor is shown as being a cap bolt 72, Fig. 5, extending through this slot 71 and threaded into a suitable opening 73 in an underlying portion of the lever 43. By tightening the cap bolt 72, the lever 68 will be fastened rigidly to the lever 43 with the position of the lever and hence of the wheel 61 carried thereby angularly adjusted within limits in relation to the arcuately curved portion 35a of the inner guide rail. This adjustment also serves to adjust to some extent the projection of the peripheral portion of the wheel 61 beyond the inner guide rail. The extent of such projection may be adjusted further by adjusting the position of the wheel supporting member 64 along the slot 65. The cap bolt 69, on which the lever 68 is mounted, also may be tightened to aid in securing the desired rigidity of the lever 68 with the lever 43.

The wheel 61 is shown as having a channeled rim, 61a, Fig. 5, on which an endless hollow tube or tire 75 is mounted. This tire may be made of rubber or other suitable material which will permit the tire to yield under pressure toward the axis of rotation of the wheel and which will not scratch or mar the articles which may contact therewith in the operation of the device. Obviously, the covering or peripheral portion of the wheel may consist of a suitable layer of rubber or other suitable material and need not be of tubular form although that form is preferred.

The delivery disk conveyor 38 may be rotated in the direction of the arrow in Fig. 1 by the operation of a pulley 76 on the shaft 39 and a belt 77 between such pulley and a pulley 78 on the drive shaft 27 for the rotating disk 26, all as best seen in Fig. 2. It will be understood that the driving mechanism has conventional structural and operating features which may be altered or adjusted in a known manner so that the directions of rotation of the conveyor disks 26 and 38 may be reversed if desired, and the speeds of the several article conveying parts of the device may be suitably predetermined and coordinated. In general, the speed of the rotary delivery conveyor 38 should be sufficient to carry away the articles passing thereto in a uniformly spaced single file order. The disk 26 delivers such articles directly onto the rotating delivery conveyor 38, such articles being guided onto the latter by portions of the cooperative guide rails. A wedge shaped plate 79 is shown in Fig. 1 as filling a slight gap between portions of these two rotating disk conveyors so that each article will have adequate undersupport during its movement from the conveyor 26 onto the disk 38.

The operation of the device as hereinbefore described will be readily understood. The articles to be conveyed and arranged in a single file order may be placed on the carrying-in or supply conveyor 15—15 in lots or groups, as directly from cartons, or delivered thereto in any other suitable known manner. As the leading articles arrive at the entrance A between the guide rails, they will move rapidly and uninterruptedly therethrough into and along the narrow runway B so long as one of the two leading articles is an appreciable distance ahead of the other. This is the condition which is shown in Fig. 1, in which the articles are represented by the circles 80. However, it will be understood that the conditions, so far as relative positions of the articles moved into and through the narrowing passage or entrance A is concerned, are constantly changing and that the two leading articles may occupy various relative positions. As shown in Fig. 7, for example, the two leading articles 80 at the entrance to the runway in positions are nearly abreast of each other so that they tend to become wedged in the passage and thus tend to cause a jam. The outer of these two articles is, however, very slightly ahead of the inner article. The inner article is in contact with the peripheral surface of the wheel 61. The inner guide rail is at the limit of its oscillatory stroke toward the delivery disk 38 or in other words at the limit of its stroke to narrow the runway portion of the article passage. The rotating disk conveyor 26 tends to move these articles through the entrance A into the runway B. In this situation, the frictional contact of the inner article 80 with the periphery of the wheel 61 as the inner guide rail starts its return stroke will cause rotation of the inner article 80 in a clockwise direction as indicated by the arrow in Fig. 8. The rolling movement of the inner article 80 has been communicated to the outer article 80 which is rolled in a counter-clockwise direction. The combined effect of the forces involved will cause the outer article to move forward more rapidly than the inner article. At the stage of the operation illustrated in Fig. 8, the relative positions of the two articles have changed from their Fig. 7 positions, shown by dotted lines, to the positions shown by full lines. The rate of change of relative positions of the two articles may be accelerated on further oscillatory movement of the inner guide rail on its return stroke. This is shown by Fig. 9, in which the initial or Fig. 7 relative positions of the two articles are indicated by the dot-and-dash lines, the dotted lines indicate their relative positions at the stage of operation illustrated in Fig. 8, and the full lines indicate their relative positions at the subsequent stage illustrated in Fig. 9. The outer article now will be sufficiently far ahead of the inner article to preclude any possibility of jamming. It of course will be understood that there may be other articles on the rotating conveyor 26 back of the two articles which alone are shown in Figs. 7 to 9, inclusive.

It may be noted at this point that in predetermining the position of the projecting peripheral portion of the wheel 61 in the passage between the two guide rails, the radial line between the two rails at which two of the articles could jam is determined when the inner guide rail is at the limit of its runway-narrowing stroke and again when the inner guide rail is at the end of its return or runway-widening stroke and the locations of the inner ends of these two radial lines are marked on the inner guide rail. The wheel 61 is then located with reference to these marks on the inner rail so that both are within the confines of the projecting peripheral portion of such wheel. It then will be impossible for two of the articles to jam between the two guide rails as the movable projecting portion of the wheel 61 will intervene and cause relative movement between the articles before they can reach jamming positions.

In the situation illustrated by Fig. 10, the two leading articles 80 are in the narrowing passage or entrance A to the narrow runway B in positions at which they are nearly abreast of each other, the outer article being slightly at the rear of the inner article. The inner guide is at the end of its runway-narrowing stroke. Starting with this condition and assuming that the two leading articles or at least the inner article cannot move rearwardly on the conveyor 26 because there is no space available in the crowd of articles at the rear, the inner article will be rotated in a counter-clockwise direction and the wheel 61 and the outer article will be rotated clockwise as the inner guide rail moves on its return stroke. The hollow tire or yielding peripheral portion of the wheel will be compressed by the inner article, as indicated at 81 in Fig. 11, sufficiently to permit this result. As the return stroke of the inner guide rail proceeds, the inner article will move ahead of the outer article into the narrow runway, as from the relative position indicated by the dot-and-dash lines to that shown by the full line, Fig. 12, thus effectually breaking up the incipient jam.

It will be apparent that there will be numerous varying relative positions of the two leading articles at the entrance to the narrow runway and numerous different conditions of pressure on these articles from oncoming articles crowded in the narrowing passage. If the inner article is sufficiently ahead of the outer article, the rotation of the wheel 61 by the rolling contact of the inner article therewith ordinarily will be clockwise with, or without compression of the hollow tire or yielding peripheral surface portion of that wheel, and the inner article will be projected ahead of the outer article at a relatively accelerated forward speed. On the other hand, if the outer of the two leading articles is ahead of the inner article, the forward movement of the inner article will be relatively retarded or decelerated, the rotation of the wheel 61 ordinarily will be in a counter-clockwise direction, and the outer of the two articles will be projected ahead at a relatively accelerated speed. Jamming will be prevented or obviated under all such conditions without any necessity for manual action to clear the entrance to the runway.

In the modification shown in Figs. 13 and 14, the outer rail is designated 134 and its arcuate portion 134a carries an adjustable abutment 82 which may project slightly into the narrowing passage or entrance A opposite the wheel abutment 61. As shown, the abutment 82 is a rounded or convex projection on the head 83 of a bolt which has a shank 83a extending through a slot 84 in the outer guide rail. The head 83 of this bolt is disposed within a relatively wide inner portion 84a of the slot and a wing nut 85 may be tightened on the shank of the bolt at the outer side of the rail to secure the abutment to the latter in adjusted position along the slotted portion of the rail. The extent of projection of the abutment into the passage may be increased slightly beyond that shown by placing a shim or washer (not shown) under the head of the fastening bolt.

The operation of this form of structure is substantially like that hereinbefore described except that the abutment 82 may serve to retard the forward progress of the outer of two leading articles so that the inner of such articles may move ahead and enter the runway B first. This construction is advantageously usable with articles of circular cross-sectional configuration and also with articles which are non-circular.

In the modification shown in Fig. 15, an outer wheel abutment 86 extends through a horizontal slot 87 in the curved portion 234a of an outer guide rail 234 at a place opposite the inner rotary abutment wheel 61. This wheel 86 is rotatably supported to turn about the axis of a vertical stud 88 on a bracket arm 89, the bracket being clamped to the outer guide rail at a position along the latter which may be adjusted within limits, as by clamping means indicated at 90.

The form of the device shown in Fig. 15 is especially well adapted for use with articles which are non-circular in cross sectional configuration. The articles shown in this view, designated 180, are octagonal. It will be apparent that articles of this description have numerous flat sides which may be brought flatwise together so as to increase the likelihood of jamming of articles in the narrowing passage or entrance A to the narrow runway B. By providing rotary wheel abutments at both the inner and outer sides of this narrowing passage or entrance, no stable support is afforded at either end of a line passing through the centers of two leading articles in the narrowing passage or entrance A to the runway. Hence, even if these articles have their flat sides pressed firmly together, substantially as shown for two of the articles in Fig. 15, the contact of their remote surfaces with the rotary abutments will cause one or the other of such articles to move ahead of the other at a relatively accelerated rate, thus effectually preventing jamming of these articles in the entrance to the runway.

We do not wish to be limited to the details of the illustrative embodiments of the invention shown in the accompanying drawings and herein particularly described as many modifications thereof and changes therein will now be obvious to those skilled in the art to which our invention pertains.

We claim:

1. An apparatus of the character described, comprising a conveyor having a flat upper surface on which a large number of articles, such as bottles, jars or other containers, may stand upright, a stationary article guide rail extending above a marginal edge portion of said conveyor, a horizontally oscillatory article guide rail pivotally supported at the side of said conveyor opposite the stationary guide rail and extending obliquely across said conveyor toward said stationary guide rail, said guide rails cooperating to define between them a through passage for articles carried by said conveyor, said passage having a relatively narrow end portion through which said articles on said conveyor can pass only in a single file order, being relatively wide at its opposite end to permit entry thereinto of a crowd or congestion of such articles, and decreasing in width from its relatively wide end to its relatively narrow end portion, means for driving said conveyor to carry the articles thereon through said passage from the wider end thereof, means for oscillating said oscillatory guide rail to cause relative motion between crowded together or congested articles in said passage, and an article abutment mounted on said oscillatory guide rail for independent turning movement about a vertical axis, said abutment projecting into the passage in position to be struck and turned about its axis by the adjacent of any two of the articles attempting to move abreast through the portion of the passage containing the abutment.

2. An apparatus of the character described, comprising a rotary horizontal disk, means for rotating said disk, converging article guide rails mounted above said disk and formed to define between them an open-ended article passage of decreasing width, extending part way around the axis of rotation of said disk and of only slightly greater width at its narrower end than the width of the individual articles to be carried by the rotating disk through said passage, means for oscillating one of said guide rails, and an article abutment mounted on the oscillating guide rail to turn individually about a vertical axis and to project into said passage at a place at which the passage is approximately twice the with of said individual articles.

3. An apparatus of the character described, comprising a rotary horizontal disk, means for rotating said disk, converging article guide rails mounted above said disk and formed to define between them an open-ended article passage of decreasing width, extending part way around the axis of rotation of said disk and of only slightly greater width at its narrower end than the width of the individual articles to be carried by the rotating disk through said passage, means for oscillating one of said guide rails, and a horizontal wheel abutment rotatably mounted on the oscillating guide rail to project past the latter into a part of the passage that is adjacent to and of substantially greater width than the narrower end thereof, said wheel being turnable freely in either of opposite directions about its axis of rotation by an article in said passage in frictional contact therewith.

4. An apparatus of the character described, comprising a rotary horizontal disk, means for rotating said disk, converging article guide rails mounted above said disk and formed to define between them an open-ended article passage of decreasing width, extending part way around the axis of rotation of said disk and of only slightly greater width at its narrower end than the width of the individual articles to be carried by the rotating disk through said passage, means for oscillating one of said guide rails, and a horizontal wheel abutment rotatably mounted on the oscillating guide rail to project past the latter into a part of the passage that is adjacent to and of substantially greater width than the narrower end thereof, said wheel being turnable freely about its axis of rotation in either of opposite directions by an article in said passage in frictional contact therewith, said wheel having a peripheral covering of compressible, elastic material.

5. An apparatus as specified in claim 1 and, in combination therewith, means for supplying said articles onto said conveyor in positions to be carried by the latter into the relatively wide end of said passage, and means at the opposite side of said conveyor for receiving and carrying away the articles emerging from the narrower end of said passage.

6. An apparatus of the character described comprising a rotary horizontal disk conveyor, a horizontal outer guide rail comprising an arcuately curved portion extending above the peripheral edge portion of said disk conveyor part way around the axis of rotation thereof and opposite end portions diverging from the periphery of said disk conveyor, a substantially U-shaped inner guide rail, means for supporting said inner guide rail above said disk conveyor so that the bight thereof is turned toward the arcuately curved portion of the outer guide rail and is located between the latter and the axis of rotation of the disk conveyor and an end portion of the inner guide rail extends obliquely across the disk conveyor in divergent relation to the corresponding end portion of the outer guide rail, and so that said inner guide rail may be oscillated horizontally about an axis located at the opposite side of the disk conveyor from the outer guide rail, said guide rails cooperating to define between them a through passage for articles carried by said conveyor when the latter is rotated, said passage being relatively wide between said divergent end portions of the guides to accommodate a congestion or crowd of individual articles and thereafter converging to a narrow runway portion through which said articles can pass only in a single file, means for rotating said disk conveyor to carry articles thereon through said passage from the relatively wide end thereof, means for oscillating said inner guide rail to agitate articles on the conveyor in the convergent portion of said passage, and a horizontal abutment wheel projecting past the bight of said inner guide rail into said passage at a place in advance of the entrance to the narrow runway portion, said abutment wheel being mounted to oscillate bodily with said inner guide rail and for independent turning movement about its own vertical axis.

7. An apparatus as specified in claim 6 wherein the abutment wheel has a hollow rubber tire covering for its periphery.

8. An apparatus as specified in claim 6 wherein the abutment wheel is turnable freely in either direction about its vertical axis.

9. An apparatus as specified in claim 6 and in combination therewith, means for adjusting the position of the abutment wheel with respect to the bight of the inner guide rail to vary the extent of projection of said wheel in said passage.

10. An apparatus as specified in claim 6 and in combination therewith, means for adjusting the position of the projecting abutment wheel along the bight of the inner guide rail.

11. An apparatus as specified in claim 6 and in combination therewith, a movable horizontal conveyor for supplying articles to said disk conveyor at the entrance to the relatively wide end of said passage, a further movable horizontal conveyor at the opposite side of said disk conveyor and partially underlying the adjacent end portion of said outer guide rail for receiving articles in single file order from said rotary disk conveyor, and means for driving said additional conveyors to coordinate their movements with the rotation of the horizontal disk conveyor.

12. An apparatus as specified in claim 6 and in combination therewith a fixed article abutment carried by said outer guide rail in position past the latter into said passage at a place approximately opposite said abutment wheel.

13. An apparatus as specified in claim 6 and in combination therewith an outer abutment wheel rotatably mounted on said outer guide rail to turn freely about a vertical axis and so that a peripheral portion thereof projects past said outer guide rail into said passage at a place approximately opposite said first named abutment wheel.

14. Apparatus of the character described comprising a rotary horizontal disk conveyor, an outer guide rail curved to conform to the peripheral curvature of said disk conveyor and mounted above a peripheral edge portion of said conveyor, a horizontal lever pivoted to swing about a vertical axis at the opposite side of said conveyor from said guide rail and to extend above said conveyor toward the guide rail, the free end portion of said lever being approximately T-shaped, a substantially U-shaped horizontal inner guide rail connected at its sides to the T-shaped free end portion of said lever so that the bight of said inner guide rail is turned toward said outer guide rail and is spaced therefrom, a cam mounted to turn with said disk conveyor about the axis of the latter, a cam follower carried by a lateral branch of the T-shaped end portion of the lever in position to follow the peripheral contour of the cam, spring means for acting on said lever to hold said follower against said cam, and means for rotating said disk conveyor.

15. Apparatus as specified in claim 14 and in addition a freely turnable horizontal abutment wheel pivotally mounted on the T-shaped end portion of said lever in position to project beyond the bight of said inner guide rail into the space between the latter and said outer guide rail.

16. Apparatus as specified in claim 14 and in addition a roller carried by said lever in position to rest upon said disk conveyor to aid in supporting the latter in horizontal position.

17. In an apparatus of the character described, a conveyor for supporting a large number of articles, such as bottles, upright and for moving them horizontally, spaced side guides above and in cooperative relation with the conveyor to define between them a convergent passage for the upright articles on the conveyor, said passage being sufficiently wide at one end to accommodate a crowd or congestion of said articles and being sufficiently narrow at its opposite end to accommodate said articles only when they are passing therethrough in a single file, means for driving said conveyor to move the articles thereon through said passage from the wider to the relatively narrow end thereof so as to arrange said articles in a single file order, and an abutment wheel mounted to turn freely about a vertical axis and to project beyond one of said guides into said passage at a place at which the width of the passage decreases from slightly greater to slightly less than the combined widths of any two of said articles, whereby the projecting peripheral surface of said abutment wheel will afford only an unstable lateral support for any two of such articles which have been crowded into the portion of the passage between said abutment wheel and the opposite side guide and will prevent jamming of such articles in said passage.

18. In an apparatus of the character described, a substantially horizontal movable conveyor on which articles, such as bottles, may stand upright, spaced side guides above and in cooperative relation with said conveyor, one of said guides being horizontally oscillatory relative to the other and said guides being cooperatively shaped to define between them a convergent passage having a width at one end sufficiently great to accommodate a crowd or congestion of the articles on the conveyor and being sufficiently narrow at its opposite end to permit said articles to pass therethrough only in single file, means for driving said conveyor to move the articles thereon through said passage from the wider to the narrow end thereof, means for oscillating the oscillatory side guide, and a substantially horizontal abutment wheel mounted to move bodily with said oscillatory side guide and to turn freely about a vertical axis such that the periphery of said wheel projects beyond said oscillatory side guide into the passage at a place at which the latter varies from a width slightly greater to, a width slightly less than the combined widths of any two of the articles being moved through said passage.

THOMAS J. GAGNON.
ARNOLD S. ALCORN.